United States Patent [19]

Bilow et al.

[11] E Re. 30,217

[45] Reissued Feb. 19, 1980

[54] COPOLYMER OF POLYIMIDE OLIGOMERS AND TEREPHTHALONITRILE N,N-DIOXIDE AND THEIR METHODS OF PREPARATION

[75] Inventors: Norman Bilow, Los Angeles; Abraham L. Landis, Northridge; Leroy J. Miller, Canoga Park, all of Calif.

[73] Assignee: Hughes Aircraft Company, Culver City, Calif.

[21] Appl. No.: 899,765

[22] Filed: Apr. 24, 1978

Related U.S. Patent Documents

Reissue of:

[64] Patent No.: 3,864,309
Issued: Feb. 4, 1975
Appl. No.: 416,483
Filed: Nov. 16, 1973

U.S. Applications:

[63] Continuation-in-part of Ser. No. 347,535, Apr. 3, 1973, abandoned, and Ser. No. 413,473, Nov. 6, 1973, Pat. No. 3,845,018, which is a continuation-in-part of Ser. No. 347,501, Apr. 3, 1973.

[51] Int. Cl.[2] ..... C08G 73/12

[52] U.S. Cl. ..... 525/426; 526/259; 526/263; 528/170; 528/228; 528/322; 528/487; 525/436; 525/377

[58] Field of Search ..... 526/259, 263, 285, 15, 526/52; 528/170, 228, 322

[56] References Cited

U.S. PATENT DOCUMENTS

| | | | |
|---|---|---|---|
| 3,436,372 | 4/1969 | Hoegger | 528/229 |
| 3,437,636 | 4/1969 | Angelo | 528/188 |
| 3,516,967 | 6/1970 | Funer | 528/188 |
| 3,526,610 | 9/1970 | Bower | 528/229 |

*Primary Examiner*—Lester L. Lee
*Attorney, Agent, or Firm*—Booker T. Hogan, Jr.; W. H. MacAllister

[57] ABSTRACT

We have disclosed a new class of thermosetting copolymers derived from terephthalonitrile N,N'-dioxide and polyimide oligomer that cure through addition reactions to form essentially void-free cured resins that exhibit outstanding high temperature stability. These copolymers may be formed from either acetylene terminated polyimide oligomers or nitrile terminated polyimide oligomers. Copolymers prepared in accordance with our invention exhibit little or no outgassing during cure and are extremely useful in the preparation of laminates where high temperature stability and high strength is required.

10 Claims, No Drawings

COPOLYMER OF POLYIMIDE OLIGOMERS AND TEREPHTHALONITRILE N,N-DIOXIDE AND THEIR METHODS OF PREPARATION

Matter enclosed in heavy brackets [ ] appears in the original patent but forms no part of this reissue specification; matter printed in italics indicates the additions made by reissue.

The invention herein described was made in the course of or under a contract or subcontract thereunder with the United States Air Force.

CROSS-REFERENCE TO RELATED APPLICATIONS

*This application is a Continuation-in-Part of U.S. application Ser. No. 347,535, filed Apr. 3, 1973, and also a Continuation-in-Part of U.S. application Ser. No. 413,473, filed Nov. 6, 1973, as a Continuation-in-Part of U.S. application Ser. No. 347,501, filed Apr. 3, 1973.*

*Application Ser. No. 347,535 has subsequently been abandoned in favor of allowed application Ser. No. 702,818, filed July 6, 1976.*

*Application Ser. No. 413,473 subsequently issued as U.S. Pat. 3,845,018 on Oct. 29, 1974.*

[The polyimide oligomers, utilized to form the copolymers of our invention, are disclosed in U.S. Pat. applications Ser. Nos. 347,501 and 347,535 filed on Apr. 3, 1973.]

BACKGROUND OF THE INVENTION

1. Field of the Invention

Our invention is concerned with polyimide oligomer-dinitride dioxide copolymers and methods for the preparation thereof. The subject matter of Group Art Class 260 can be characterized as generally related.

2. Description of the Prior Art

The patent literature has fully disclosed the preparation of polyimide oligomers which, when fully cured, are relatively insoluble and intractable materials. When there materials are used as laminating resins, adhesives, etc., they are applied in the form of polyamic acid or ester precursors and then cured. This cure step produces water or alcohol as byproducts, that are volatile at the elevated temperatures required to accomplish complete curing which result in the formation of large amounts of undesirable voids in the final composition assembly.

The advantage of our invention over the current state of the art lies in the ability of our polyimides to cure without the evolution of copious quantities of volatile byproducts such as are seen when conventional polyamic acid based polyimide precursors are cured. Our copolymers thus have very low void contents in their cured or fabricated states. Low void characteristics are not unique for polymers such as the epoxies which are useful to approximately 300°-400° F. However, this characteristic is unique for high temperature polymers such as the block copolymers of our invention which are stable to approximately 600° F.

We have discovered that cyano substituted polyimide oligomers, and acetylene substituted polyimide oligomers will copolymerize by an addition polymerization process. These oligomers are new to the art as disclosed by U.S. Pat. applications Ser. Nos. 347,501 and 347,535. Conventional polyimide oligomers form copolymers by condensation polymerization processes generally and thus do not exhibit the low void characteristics of the copolymers of our invention when fully cured.

The literature discloses bis maleimide type polyimides that have been marketed which cure via addition polymerization processes. However, it should be noted that with these polyimides cyclopentadiene is liberated as a byproduct during the initial period prior to cure. This characteristic, therefore, tends to limit their usefulness in applications where a non-outgassing polymer is required. Furthermore, these bis maleimide type polyimides lose a larger proportion of their cyclopentadiene when they are used as thin coatings than they do when used in thick section laminates or molding compounds. Thus, their compositions differ from application to application yielding products whose properties are not consistent within a given design.

Dinitrile dioxide reactants have been used to form copolymers with difunctional comonomers having acetylenic and ethylenic unsaturation (Frazz, U.S. Pat. No. 3,213,068). These copolymers are characterized by the fact that they contain an isoxazoline ring.

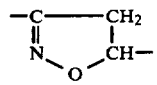

I and/or an isoxazole ring in the backbone

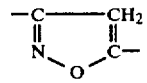

II or linear chain of the polymer, and are prepared from nonpolymmeric reactants. It can be concluded that this patent teaches that ethynyl substituted aromatic oligomers would tend to yield products useful primarily for compression molding.

DESCRIPTION OF THIS INVENTION

The copolymer technology described herein allows us to produce hybrid polyimides which cure through addition; that is, the molecules interact without liberating byproducts. This invention can be contrasted with conventional state-of-the-art polyimides which are generally derived from polyamic acids or esters and liberate water or alcohol as a byproduct during cure.

The copolymers of our invention are produced by the reaction shown below

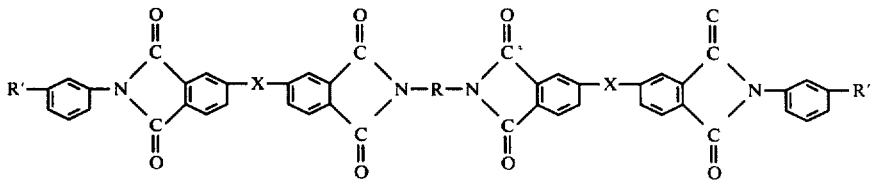

-continued

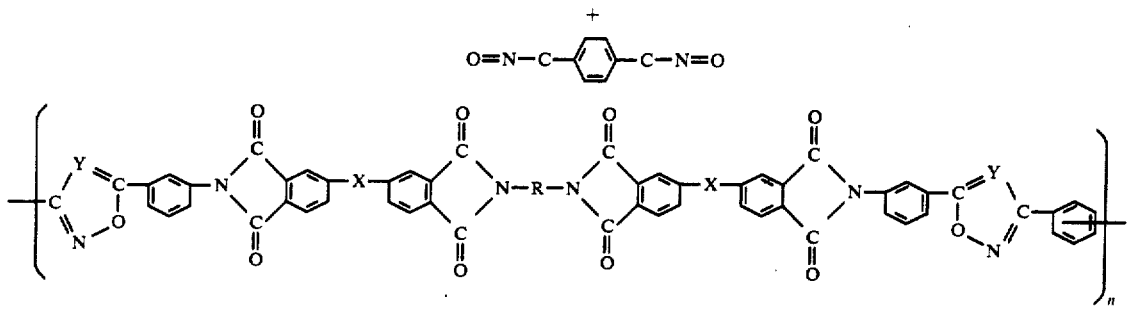

where

R′=HC≡C— or N≡C—

X=CO, O, $CH_2$, $SO_2$, or $-(CF_2)-_n$

Y=CH, N R=—$C_6H_4OC_6H_4$—, —$C_6H_4OC_6H_4OC_6H_4$—, or —$C_6H_4OC_6H_4OC_6H_4OC_6H_4$— and where

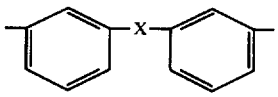

may be replaced by

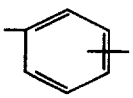

The copolymerization is believed to occur via the additional process illustrated below:

IV

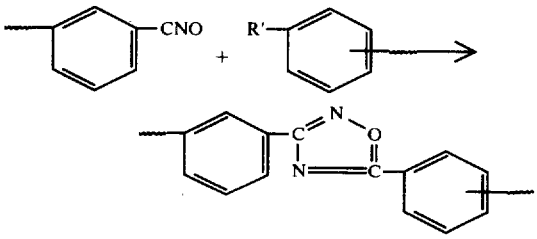

where R′ is —C≡N and

V

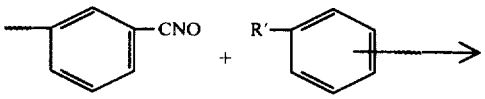

-continued

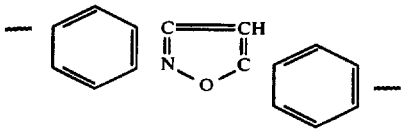

where R′ is —C≡CH.

While we currently prefer to form copolymers with our oligomers and terephthalonitrile N,N′-dioxide, other dinitriledioxide such as

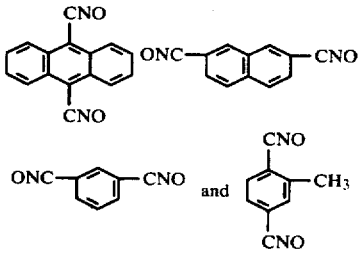

may be used.

A method for the preparation of the oligomer used in our invention when A=HC≡C— is shown in Example 1 below.

EXAMPLE I

A solution of 1,3-di(3-aminophenoxy)benzene (5.80 grams, 0.0198 mole) in 50 ml of dry dimethylformamide was added dropwise to a rapidly stirring solution of benzophenone-tetracarboxylic dianhydride (17.78 grams, 0.0397 mole) in 50 ml of dry dimethylformamide. The solution was heated at gentle reflux for several hours. Then 3-aminophenylacetylene (5.12 grams, 0.0438 mole) was added and the mixture was heated at 80° C. for 16 hours. The solvent was then removed using the rotary evaporator and to the residue was added acetic anhydride (100 ml) and the mixture was heated at reflux for several hours. After allowing the slurry to stand overnight, the mixture was dispersed in 350 ml of absolute ethanol, filtered and washed with fresh ethanol. The resin was then vacuum dried to yield 14.1 grams of product. The structure of this oligomer can be represented as follows:

VIII

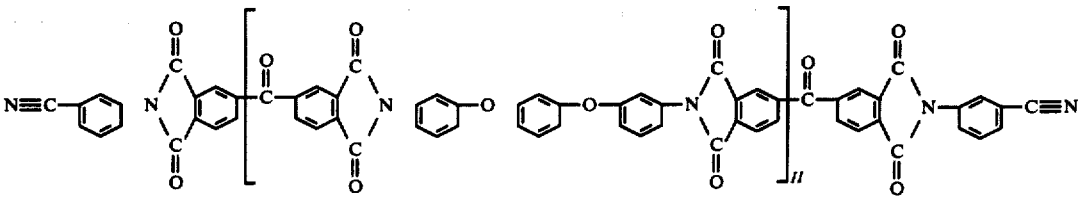

When R′ is N≡C—, the oligomer has the following general structure

VII

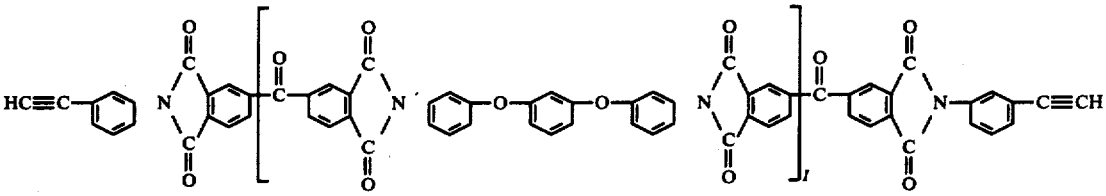

where: n = 1 and can be prepared by Examples II–IV below:

EXAMPLE II

A solution of 1,3-di(3-aminophenoxy)benzene (8.50 grams. 0.0291 mole) in 45 ml of dry dimethylformamide was added to a solution of benzophenone-tetracarboxylic dianhydride (19.32 grams, 0.0582 mole) in 75 ml of dimethylformamide. The solution was heated just below reflux for 30 minutes. Then solid 3-amino benzonitrile (7.56 grams, 0.0640 mole) was added and the solution heated at a gentle reflux for 45 minutes. The solvent was evaporated off in a rotary evaporator. To the resinous residue was added 250 ml of acetic anhydride. The mixture was heated at reflux for 3 hours and the bright yellow slurry cooled to room temperature and poured into 1,200 ml of absolute ethanol. After filtering the light yellow product, it was redispersed in 400 ml of absolute ethanol and filtered. This was done one more time then the product was vacuum-dried at 80° C. for 1 day to yield 22.4 grams (65 percent of theory) of prepolymer. This prepolymer, when heated on the melting point block, started to soften at 145° C. and upon further heating decreased in viscosity. At 165° C. it is quite tacky. Further heating resulted in a light yellow amber viscous liquid.

EXAMPLE III

A solution of 1,3-di(3-aminophenoxy)benzene (14.0 grams, 0.0480 mole) in dry dimethylformamide (75 ml.) was added to a rapidly stirring solution of benzophenonetetracarboxylic dianhydride (31.8 grams, 0.0960 mole) in dimethylformamide (125 ml.) The solution then was heated at gentle reflux for 45 minutes. The heating was discontinued and solid 3-aminobenzonitrile (12.45 grams, 0.106 mole) was added all at once and the solution once more was heated at gentle reflux for 45 minutes. The solvent was removed using a rotary film evaporator and to the residue was added acetic anhydride (410 ml) and the mixtured stirred at room temperature for 16 hours. After heating the mixture at reflux for 3 hours, the slurry was cooled to room temperature and slowly added to 2 liters of absolute ethanol. The precipitated resin was separated by centrifugation and the resin was dispersed in ethanol (600 ml.), filtered through a Buchner funnel and pressed dry using a rubber dam. The product was dried in a vacuum oven at 80° C. It weighed 35.3 grams.

EXAMPLE IV

A solution of 1,3-di(aminophenoxy)benzene (35.15 grams, 0.1204 mole) in dimethylformamide (150 ml.) was added over a 30 minute period to a rapidly stirring solution of benzophenonetetracarboxylic dianhydride (80 grams, 0.2408 mole) in dimethylformamide (300 ml.). The solution then was heated at gentle reflux for 1 hour. The heating was discontinued and a solution of 3-aminobenzonitrile (31.25 grams, 0.2650 mole) in dimethylformamide (50 ml.) was added and the solution kept at ca 60°–70° C. overnight. The solvent then was removed by means of a rotary evaporator and the residue was heated with acetic anhydride (500 ml.) for 16 hours. After this time an additional quantity of acetic anhydride (700 ml.) was added and the mixture heated at reflux for an additional 16 hours. After cooling the slurry the mixture was added to denatured alcohol (3,700 ml., with benzene as a denaturant) to precipitate the imidized resin. The precipitated solid was collected on a Buchner funnel, washed with ethanol and pressed dry with a rubber dam. The product was vacuum dried at 80° C. to yield 89 grams of a yellow powder.

Examples V through VIII teach the preparation of copolymers of this invention when the polyimide oligomer contains acetylene substitutions.

EXAMPLE V

To a solution of an acetylene terminated polyimide (2.7 g.) in 40 ml of sulfolanne (or other solvents which do not induce homopolymerization), was added terephthalonitrile N,N′-dioxide (0.395 g.) and the mixture was stirred. After 30 minutes the solution was clear. Apparent gellation took place after a total elapsed time of 2 hours. At this point the resin was recovered by precipitation with absolute ethanol and vacuum dried. The resin (2.623 grams) was B-staged in vacuum for 40 minutes at 170°–178° C. The powdered resin was molded at 485°–525° F. and a lacquer in dimethylformamide was used to impregnate a glass fabric reinforcement which was subsequently cut into sections, stacked, and molded under pressure at 485°–525° F.

EXAMPLE VI

To a stirred solution of acetylene (ethynyl) terminated polyimide oligomer (2.5 g) in sulfolane (20 ml) was added terephthalonitrile N,N'-dioxide (0.5 g). After about 2 hours at room temperature the solution gelled. The solution was allowed to stand overnight at room temperature. Subsequently the resin was recovered by precipitation with absolute ethanol and it then was dried in a vacuum desiccator. The resin (2.646 grams) was "B-staged" by heating in vacuum for 40 minutes at 235°-240° C.

A sample of the resin was used as a molding powder and molded at 485°-525° C. Another sample was dissolved in dimethylformamide and this lacquer was used to impregnate a glass fabric which subsequently was cut into sections, stacked, and molded at 485°-525° F.

EXAMPLE VII

The resin of Example I (1.030 grams, 0.000941 mole) was dissolved in 25 ml of warm sulfolane. The solution was cooled to room temperature and freshly prepared terephthalonitrile N,N'-dioxide (0.423 gram, 0.00265 mole) was added and the solution stirred at room temperature for 16 hours. The solution was then added to 100 ml of ethanol to precipitate the resin. Centrifugation was used to isolate the resin. After washing the resin several times with absolute ethanol, the product was vacuum dried at 50° C. A total of 1.18 grams of resin was obtained. This resin started to melt at 165° C. and cured when heated at 265° C. An aliquot portion of this resin (1.157 grams) was heated in argon for 30 minutes at 220° C. to B-stage it. The final weight of B-staged resin was 0.987. The resin started to melt at 200° C. and cured at 265° C.

EXAMPLE VIII

To a solution of the acetylene terminated polyimide, (20.0 grams), in 100 ml of sulfolane was added 5.0 grams of terephthalonitrile N,N'-dioxide. The nitrile oxide went into solution with noticeable heat evolved. The solution was stirred for 1 hour and an additional 5.0 grams of terephthalonitrile N,N'-dioxide was added. After about 20 minutes, the solution increased in viscosity. The mixture was stirred for an additional 30 minutes. It was added to 800 ml of fresh ethanol, filtered, and the resin washed repeatedly with fresh ethanol. The resin was air dried for 24 hours and then heated under vacuum at 110° C. for 60 minutes. The resin started to soften at 193° C. and upon further heating started to cure. A total of 23 grams of the resin was dissolved in 100 ml of dimethylformamide. The lacquer was concentrated to 77 grams on the rotary film evaporator.

An example of the utility of an acetylene substituted polyimide copolymer by our invention is shown in Example IX below:

EXAMPLE IX

The lacquer from Example VIII was used to dip coat 1581 "S" glass cloth (J. P. Stevens Co.). The solvent was removed by drying in a vacuum oven for 30 minutes at 325° F. Three dips were required to bring the solids content up to 40.5 percent. The coated cloth was cut up into 3.30 inch ×3.42 inch strips and molded by vacuum bagging. Five mill thick Kapton film was used to fabricate the bag. The following molding data obtained.

| MOLDING PARAMETERS OF LAMINATE | |
|---|---|
| Number of plies | 8 |
| Weight of reinforcement, grams | 17.535 |
| Contact time, minutes | 0 |
| Temperature, °F. | 475° |
| Pressure, psi | 15 |
| Molded weight, grams | 29.487 |
| Resin content, as molded, percent | 40.5 |
| Weight before postcure | 29.487 |
| Weight after postcure | 28.236 |
| Final resin content, percent | 37.9 |

From the molding characteristics the resin appeared too far advanced but less B-staging should allow the resin to flow better during molding.

The specimen was postcured in an argon atmosphere using the following temperature cycle: From room temperature to 400° F. within 12 hours; keep at 400° F. for 24 hours and raise temperature to 500° F. within 12 hours; hold at 500° F. for 24 hours and raise temperature to 550° within 12 hours and hold at 550° F. for 60 hours. The specimen was cooled to room temperature before removing from oven.

Examples X through XII are methods for preparation of copolymers from cyano substituted polyimide oligomers.

EXAMPLE X

The resin of Example II (20.0 grams) was added to dry sulfolane (250 ml). The dispersion was warmed to 100° C., whereupon the solid slowly went into solution. The solution was cooled to room temperature and freshly prepared terephthalonitrile N,N'-dioxide (8.0 grams) was added. The mixture was stirred rapidly at room temperature for 14 hours. An additional quantity of terephthalonitrile N,N'-dioxide (2.0 g) was added. It is noteworthy that an appreciable proportion of the nitrile oxide had gone into solution. The mixture was stirred for 7 hours at room temperature and then for 45 minutes at 50°-53° C. To isolate the A-staged resin, the reaction product was immediately added to 1 liter of absolute ethanol with rapid stirring. This procedure precipitated the resin. Because of the extremely fine nature of the product it could not be readily filtered through filter paper or a fritted glass filter thus centrifugation was used to isolate the solid resin. The product was washed four times with pure ethanol and twice with methanol. At this point it could be filtered through a fine fritted glass funnel. The product was dried in a vacuum over at 60° C. for several hours. A yield of 25.3 grams of product was obtained. This material when heated on an aluminum block, started to soften at 165° C. and was quite soft at 185° C. Upon futher heating it melted to an amber viscous liquid with a small amount of bubbling. Further heating to 230°-240° C. did not cause solidification. However, heating at 265° C. caused the resin to harden and cure.

To further advance the resin, an aliquot portion (20.0 grams), was heated for 40 minutes in an argon temperature at 230° C. During the heating of the resin a small amount of volatile material collected on the cooler portions of the vessel. The product was cooled and pulverized to yield 16.9 grams of product. Just prior to being used as a laminating resin it was added to dry dimethylformamide (80 ml.), stirred at room temperature for 16 hours, and heated at just below reflux for a few minutes. All the resin dissolved. The solvent was partially removed with the rotary evaporator to yield 64.2 grams of a lacquer having a solids content of 26.3 percent. This lacquer was used to fabricate a specimen.

EXAMPLE XI

The resin of Example III (35.0 grams) was added to dry sulfolane (430 ml). The mixture was warmed whereupon the resin dissolved to yield a clear straw-colored solution. The solution was cooled to room temperature and freshly prepared terephthalonitrile N,N'-dioxide (14.0 grams) was added and the mixture was stirred for 16 hours at room temperature. An additional quantity of terephthalonitrile N,N'-dioxide (3.5 g.) was added and the mixture was stirred for 5 hours at room temperature and then 45 minutes at 55° C. The contents then were added to 2 liters of absolute ethanol while the mixture was stirred rapidly. The precipitated product was isolated by centrifugation and the resin was washed twice with ethanol and twice with methanol. After drying in vacuum at room temperature for 16 hours, 41 grams of resin was obtained. This resin was B-staged at 230° C. for 30 minutes. During the advancing a 1 gram weight loss (2.5 percent) was observed for the resin and some condensable volatile products were present on the cooler portions of the resin kettle. An aliquot portion of this resin (35 grams) was dissolved in dry dimethylformamide (160 ml). After stirring for 42 hours at room temperature the solution was heated under gentle reflux for a few minutes and then concentrated to a total weight of 112 grams (31 percent solids content) using the rotary evaporator. The solution was free of insoluble material.

EXAMPLE XII

The nitrile terminated polyimide oligomer (30.0 grams) prepared in Example III was dissolved in 370 ml of sulfolane. It was necessary to warm the sulfolane to 90° C. to get the polyimide oligomer in solution. The resin stayed in solution upon cooling to room temperature. To this solution was added freshly prepared terephthalonitrile N,N'-dioxide and a couple of drops of boron trifluoride-etherate solution. After stirring for 18 hours, an additional quantity of terephthalonitrile N,N'-dioxide (8.1 g.) was added. When the solids had been completely dispersed, several drops of boron trifluoride-etherate solution was added and the solution was stirred for 24 hours. Once more several drops of boron trifluoride-etherate solution was added and the solution heated to 85° C. for 1 hour. At the end of this time the solution was clear and free of solids. The A-staged resin was isolated by the dropwise addition to absolute ethanol (1600 ml.). The resin was then isolated by filtration, redispersed in fresh absolute ethanol (500 ml) and filtered. This process was repeated three more times and the golden brown product dried in a vacuum oven at 100° C. for 1 hour. The yield was 47 grams although the prepolymer probably still contained some sulfolane.

The resin next was B-staged by heating at 220°-235° C. for 75 minutes in an argon atmosphere. There was a decided order of sulfolane in the volatiles which came off during the heating which indicated the tenacity with which sulfolane is entrapped in the resin. A lacquer was prepared by dispersing the resin (38.1 g) in dry dimethylformamide (200 ml). The mixture was stirred for 16 hours, heated to just under reflux for about 15 minutes and filtered. A total of 4.1 grams of solid was removed but in this case it was probably too far advanced. The filtrate was concentrated to a total weight of 114 grams on the rotary evaporator and a few drops of boron trifluoride-etherate was added. This provided a catalyzed polymer lacquer.

EXAMPLE XIII

The lacquer from Example X was used to dip coat 1581 "S" glass cloth (J. P. Stevens Co.). The coated cloth was placed in a vacuum oven to evaporate the dimethylformamide. A total of three dip treatments were used. Then the coated cloth was dried at 300° F. for 30 minutes and cut into 3×1 inch pieces and molded as shown below. Specimens 1 and 2, which had good appearance were post cured in an argon atmosphere as follows: The specimens were brought from room temperature to 400° F. in a 12 hour period; held at 400° F. for 24 hours; the temperature was increased to 500° F. in a 12 hour period and held at 500° F. for 60 minutes. The specimens were cooled to room temperature before removing them from the oven. In both specimens 1 and 2, a weight loss of 1 percent took place during the post-cure cycle.

| | 1 | 2 |
|---|---|---|
| Number of plies | 6 | 7 |
| weight of reinforcement, grams | 3.612 | 4.214 |
| Contact time, minutes | 15 | 17 |
| Temperature, °F. | 550° | 550° |
| Pressure, PSI | 2000 | 2000 |
| Cure time, minutes | 120 | 120 |
| Molded weight, grams | 5,036 | 6,379 |
| Post cure weight, grams | 4,987 | 6,250 |
| Final resin content, percent | 27.6 | 32.6 |

EXAMPLE XIV

The lacquer from Example XI was used to dip coat 1581 "S=glass cloth (J. P. Stevens Co.). The cloth was then dried in a vacuum oven at 350° F. for 1 hour. The coated cloth was cut up into 1 inch × 3 inch strips and molded as shown in the table below. Specimens 1 and 2 were molded in the press using a 1×3 inch die whereas specimen 3 was made by vacuum bagging 1×3 inch strips using Kapton film to fabricate the bag.

| | 1 | 2 | 3 |
|---|---|---|---|
| Number of plies | 8 | 8 | 7 |
| Weight of reinforcement, grams | 4.885 | 4.885 | 4.274 |
| Contact time, minutes | 14 | 19 | 0 |
| Temperature, °F. | 550° | 550° | 550° |
| Pressure, PSI | 150 | 150 | 14.7 (vac) |
| Cure time, hours | 4 | 4 | 4 |
| Molded weight, grams | 6.083 | 6.748 | 6.167 |
| Post cure weight, grams | 5.941 | 5.544 | 5.971 |
| Resin content, percent as molded | 19.69 | 27.51 | 30.2 |
| Barcol hardness | 76–80 | 65–68 | 44–52 |

The laminates had a good appearance after molding. The specimens were then post-cured in argon by first increasing the temperature from room temperature to 400° F. in a 12 hour period; the temperature was then held at 400° F. for 24 hours and then was increased to 500° F. in a 12 hour period and held at 500° F. for 60 hours. The specimens were cooled to room temperature before removing them from the oven. No blistering was noted on them and relatively little weight loss (0.2 percent) occurred.

We claim:

1. Copolymers of addition cured polyimides formed from the reaction of aromatic bis(nitrileoxides) and cyano- or acetylene-substituted polyimide oligomers and consisting essentially of the following general formula:

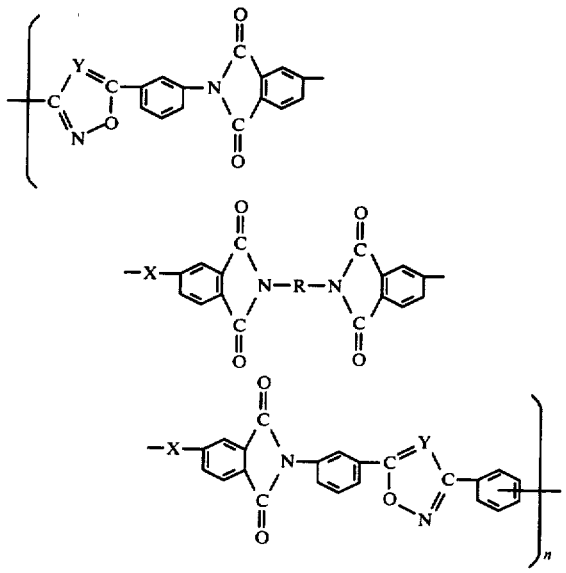

where

X=CO, O, $CH_2$, $SO_2$, or $-(CF_2)-_n$,
Y=CH or N, and
R=$-C_6H_4OC_6H_4-$, $-C_6H_4OC_6H_4OC_6H_4-$, or $-C_6H_4OC_6H_4OC_6H_4OC_6H_4-$
and where

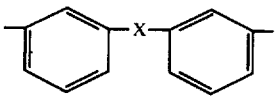

may be replaced by

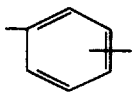

2. The copolymers of claim 1 wherein the dinitrile dioxide is terephthalonitrile N,N'-dioxide.

3. The copolymers of claim 1 wherein the polyimide oligomers consist of acetylene substituted materials having the following structure:

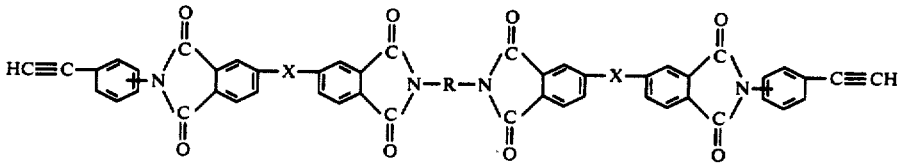

where
X=CO, O, $CH_2$, $SO_2$ or $CF_2$, and
where
R=$C_6H_4OC_6H_4-$, $-C_6H_4OC_6H_4-$, or $-C_6H_4OC_6H_4OC_6H_4OC_6H_4-$, and
wherein

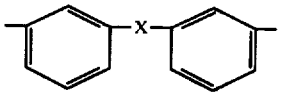

may be replaced by

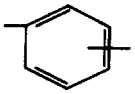

4. The copolymers of claim 2 wherein the polyimide oligomers are acetylene substituted polyimide oligomers.

5. The copolymers of claim 1 wherein the polyimide oligomers consist of cyano substituted compounds having the following structure:

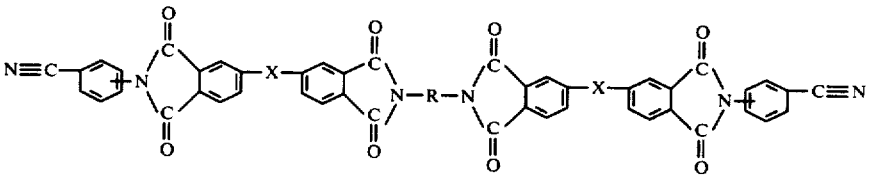

wherein
X=CO, O, $CH_2$, $SO_2$ or $CF_2$, and
wherein
R=$C_6H_4OC_6H_4-$, $-C_6H_4OC_6H_4OC_6H_4-$, or $-C_6H_4OC_6H_4OC_6H_4OC_6H_4-$, and
wherein

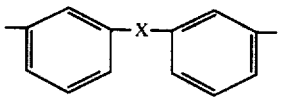

may be replaced by

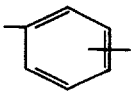

6. The copolymers of claim 2 wherein the polyimide oligomers consist of cyano substituted polyimide oligomers.

7. A copolymer of claim 4 wherein X is CO and R is $-C_6H_4OC_6H_4OC_6H_4-$.

8. A copolymer of claim 6 wherein X is CO and R is $-C_6H_4OC_6H_4OC_6H_4-$.

9. A method for preparing copolymers of bis(nitrileoxides) and acetylene substituted polyimide oligomers comprised of the steps of:

a. forming a solution of the polyimide oligomer in an organic solvent;

b. adding the bis(nitrileoxide) to said solution under constant agitation to form a mixture;

c. allowing said mixture to gel, whereby the desired resin is formed;

d. separating said resin from said gel by applying an alcoholic solvent; and e. causing said resin to be dried.

10. The method of claim 9 wherein the solvent employed to form the solution is sulfolane.

* * * * *